United States Patent [19]

Berger

[11] 4,151,154

[45] * Apr. 24, 1979

[54] SILICON TREATED SURFACES

[75] Inventor: Sidney E. Berger, Rye, N.Y.

[73] Assignee: Union Carbide Corporation, New York, N.Y.

[*] Notice: The portion of the term of this patent subsequent to Dec. 13, 1994, has been disclaimed.

[21] Appl. No.: 727,934

[22] Filed: Sep. 29, 1976

[51] Int. Cl.$^2$ .............................................. C08K 9/06
[52] U.S. Cl. .............................. 260/40 R; 260/42.15; 428/405
[58] Field of Search .................... 260/42.15, 40 R; 428/405, 40 J

[56] References Cited

U.S. PATENT DOCUMENTS

| | | | |
|---|---|---|---|
| 2,846,458 | 8/1958 | Haluska | 260/46.5 G X |
| 3,647,742 | 3/1972 | Stevens | 260/830 TW |
| 3,832,326 | 8/1974 | North et al. | 260/42.15 X |
| 3,947,371 | 3/1976 | Parent et al. | 428/405 X |
| 4,061,503 | 12/1977 | Berger et al. | 106/308 Q X |
| 4,062,693 | 12/1977 | Berger | 106/308 Q |

FOREIGN PATENT DOCUMENTS 1062595 3/1967 United Kingdom.
1278413 6/1972 United Kingdom.
1348372 3/1974 United Kingdom.

*Primary Examiner*—Sandra M. Person
*Attorney, Agent, or Firm*—Reynold J. Finnegan

[57] ABSTRACT

This invention is concerned with the treatment of particulate surfaces with a polyether substituted silicon compound which serves to enhance its employment in pigmented and/or filled paints and plastics, and in reinforced plastic composite compositions.

7 Claims, No Drawings

SILICON TREATED SURFACES

This invention relates to organosilicon treated particulate materials in which the organo group contains polyether groups. More particular, this invention is concerned with organosilicon treated inorganic particulate materials readily employable in coating compositions, plastic molding compositions and in reinforced plastic composite compositions.

Organosilicon compounds have for some time been employed in the treatment of inorganic oxide surfaces such as inorganic oxide films, particulate fillers and pigments, and fibers (such as glass fibers, aluminum fibers and steel fibers). Aluminum and steel fibers are regarded to be oxide surfaces because they are oxidized even though their subsurfaces are not. The typical organosilicon treatment involves coating such surfaces with a hydrolyzate (and/or condensate of the hydrolyzate) of an organofunctional hydrolyzable silane. Such organofunctional hydrolyzable silanes are termed "Coupling Agent" and/or "Adhesion Promoter". The organofunctional groups typically contain groups reactive with complimentarily reactive groups in the medium in which the Coupling Agent is provided. The Coupling Agent is typically supplied to the surface of the inorganic oxide whereby through the hydrolyzable groups or silanol groups ($\equiv$Si—OH), bonding through siloxy moieties ($\equiv$Si—O—) is effected. Typical hydrolyzable groups include alkoxy of 1 to about 4 carbon atoms, alkoxyalkoxy containing up to about 6 carbon atoms, halogen such as chlorine, fluorine, and bromine, acyloxy of 2 to about 4 carbon atoms, phenoxy, and oxime. The preferred hydrolyzable groups are alkoxy, alkoxyalkoxy and acyloxy. Common organofunctional groups are bonded to silicon by a carbon to silicon bond. The typical commercial functional radicals present in the organofunctional groups are vinyl, methacryloxy, primary amino, beta-aminoethylamino, glycidyl, epoxycyclohexyl, mercapto, polysulfide, ureido, and polyazamide. Another conventional technique for supplying the Coupling Agent to the inorganic oxide surface is by the integral blending technique. This technique involves adding to the resin medium the desired amount of the Coupling Agent and providing the medium in contact with the inorganic oxide surface by supplying the latter as a particulate filler or fiber to the medium or supplying the medium with the Coupling Agent to a continuous surface in the form of a film, fabric, foil or other shapes, wherein the Coupling Agent migrates within the medium to contact the surface or surfaces, react thereat and couple with the medium under the molding, curing and other shaping conditions.

As a rule, Coupling Agents enhance the chemical bonding between the medium and the inorganic oxide substrate whereby to achieve improved adhesion between them. This could affect the strength properties of the composite of the plastic or resin associated with the inorganic oxide substrate or substrates.

Apart from use of organofunctional silanes as Coupling Agents, they have been used, in selected cases, as fiber and fabric sizing agents and as pigment modifiers to alter dispersion characteristics in a given medium. Illustrative of these utilities, polyazamide silanes as disclosed in U.S. Pat. No. 3,746,748, patented July 17, 1973, are effective sizes for glass fiber woven fabrics, and methylsilanes have been employed to modify the dispersion characteristics of silica aerogels in silicone rubbers minimizing creep hardening of the silicone gum undergoing cure. The methyl groups in this case may be functional because the cure mechanism may attack them.

Silane Coupling Agents have been extensively employed in the surface treatment of inorganic particulate materials such as fillers, pigments, and materials which also act to reinforce the resin or plastic material in which it is incorporated such as asbestos fibers and relatively short length glass fibers, such as staple glass fibers. All of these have been beneficially treated by certain organofunctional silane Coupling Agents. However, in only rare instances do these Coupling Agents provide benefits other than increased adhesion. One particular exception is the use of vinyl silanes on aluminum trihydrate to enhance, to a limited degree, their dispersion in polyester resin systems. It is traditionally accepted that organosilanes add essentially no benefits to and generally detract from the properties of carbon black when employed in paints, dyes, rubber, plastics, etc., even though carbon black contains chemisorbed oxygen.

There is described herein the use of an organosilane which is relatively non-reactive in its organo moiety and has the capability of reacting with inorganic oxide surfaces (including carbon black) to which it is supplied. This silane, by virtue of the relative inactivity of its organic moiety, should not be classically termed a Coupling Agent, yet its utilization on inorganic particulate materials results, in many cases, in improved strength properties for the composite in which it is incorporated. However, the main feature of this organosilane is the fact that it provides to the particulate inorganic oxide, to which it is supplied, superior properties in the area of handling when utilized in the manufacture of a composite system. This organosilane contains polyether moieties which are essentially non-reactive in terms of their ability to covalently bond to functional or nonfunctional plastic or resinous materials, yet it does possess the capability of associatively bonding, as well as provide a measure of compatibility, with the resin or plastic system in which the particulate inorganic oxide containing it is to be supplied.

The organosilanes of this invention are characterized as structures having the following general formula:

$$R''+OR'+_a ORSiX_3 \tag{I}$$

R is Formula (I) can be any divalent organic group which is either oxygen or carbon bonded to the silicon atom.

R may be any divalent radical which effectively joins the remainder of the molecule to the silicon atom. In essence, R is an inert moiety to the invention because the invention serves the function which contemplates two components joined together into one molecule. The first component is a hydrolyzable group characterized by the moiety—SiX$_3$ and the second component is the group characterized by the moiety . Though typically the relationship of the two moieties to each other in the classical sense of Coupling Agents, assuming the $+OR'+_a$ moiety was termed organofunctional, would be dependent upon the size and chemical characterization of "R", that relationship is not apparent in the case of the instant invention. Thus given a particular "R", there exists an $+OR'+_a$ and a $\equiv$SiX$_3$ combination which provides the advantages of this invention.

Usually, when R is an extremely large or bulky moiety, its impact upon the utility of the organosilane of formula (I) can be mitigated by increasing the size of a and/or using a solvent, such as ethanol, when the silane is supplied to the alumina trihydrate.

Though other desirable R's will be illustrated hereinafter, the preferred R is an alkylene group containing from 1 to about 8 carbon atoms, preferably 2 to about 6 carbon atoms. $R^I$ is one or more 1,2-alkylene groups each containing at least 2 carbon atoms and typically not more than about 4 carbon atoms, preferably $R^I$ is ethylene. $R^{II}$ is hydrogen, an alkyl group containing 1 to about 8 carbon atoms, preferably 1 to about 4 carbon atoms, acyloxy (of 2 to about 4 carbon atoms) or an organofunctional group as defined below for $R^3$, X is a hydrolyzable group such as alkoxy containing, for example, 1 to about 4 carbon atoms, alkoxyalkoxy in which the terminal alkyl contains 1 to about 4 carbon atoms and the internal alkyl is alkylene which contains 2 to about 4 carbon atoms and is preferably ethylene; acyloxy such as acetoxy, propionoxy and the like; aryloxy such as phenoxy, para-methylphenoxy; oximes; calcium oxide, sodium oxide or potassium oxide; and the like. In formula (I), a is a number having an average value of 4 to about 150, preferably about 4 to about 120.

The silane of formula (I) as a preferred embodiment is described in U.S. Pat. No. 2,846,458, patented Aug. 5, 1958. A particular illustration of that silane is set forth at Column 3, line 20, et sequence, of the aforestated patent. However, this invention is not to be construed as limited to the particular silanes which are described in the patent. For example, the patent is exceedingly restrictive in terms of the description of the divalent organic group which joins the polyether to the silicon atom. In accordance with this invention, that divalent organic group encompasses a much greater class of moieties.

Illustrative of the expanse of moieties encompassed by R above, are the following:

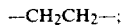

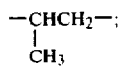

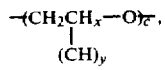

to about 20, x is 1 when y is 1 and 2 when y is 0, and y is 0 or 1;

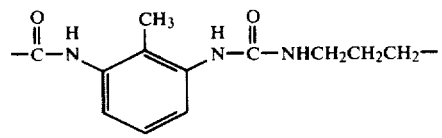

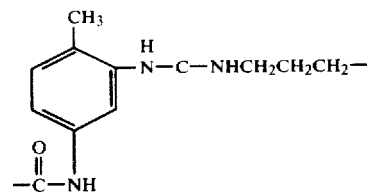

-continued
—CH₂CH₂CH₂SCH₂CH₂CH₂—;

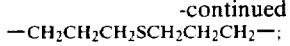

As can be seen from the above, the characterization of R is exceedingly diverse and its ultimate limits have not been ascertained except insofar as all experimental evidence has indicated that it constitutes a basically inert component as compared to the function of the hydrolyzable silicon moiety and the separate polyether moiety as characterized above.

Illustrative of the $-(OR^I)_a$ moiety of the silanes of formula (I) is the following:

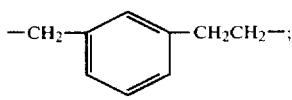

in which $R^{III}$ and $R^{IV}$ are different 1,2-alkylene radicals, in which $R^{III}$ is ethylene and $R^{IV}$ is 1,2-propylene or 1,2-butylene, p is a number greater than q and the sum of p and q is equal to the value of a.

The silanes of formula (I) may be used alone or in combination with another and different silane, such as one encompassed by formula:

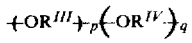 (II)

or the cohydrolyzate or the cocondensate of such silane with that of Formula (I) above. In formula (II), n is equal to 0 or 1 and $R^3$ is an organic radical whose free valence is equal to the value of b and can be alkyl group of 1 to about 18 carbon atoms, preferably about 3 to about 14 carbon atoms, or an organofunctional group bonded to silicon by a carbon to silicon bond. The organofunctional group thereof may be one or more of the following illustrative groups; vinyl, methacryloxymethyl, gammamethacryloxypropyl, aminomethyl, beta-aminopropyl, gamma-aminopropyl, delta-aminobutyl, beta-mercaptoethyl, gamma-mercaptopropyl, gamma-glycidoxypropyl, beta-(3,4-epoxycyclohexyl)ethyl, gamma-chloroisobutyl, polyazamides such as described in U.S. Pat. No. 3,746,348, gamma-(beta-aminoethyl)-aminopropyl, (ethylene beta-aminoethyl) methacryl ammonium hydrohalide, beta-(4-vinylbenzyl) ethylene-beta-aminoethyl) ammonium hydrohalide, and the like. Any organo functional hydrolyzable silane suitable for use as a Coupling Agent may be employed in combination with the silane of formula (I). In formula (II), b is a positive number, generally 1 and typically not greater than about 5, and X is the same as described for formula (I).

When there is employed a combination of or coreaction products of the silanes of formulas (I) and (II), the amount of silane of formula (I) employed should be that amount which provides a viscosity reduction and other advantages as hereindefined. Any amount of the silane formula (II) may be employed so long as such does not hinder the role of the silane of formula (I)

The silane of formula (I) can be separately employed with the silane of formula (II). For example, they can both be applied neat or from aqueous solution to the substrate simultaneously or in sequence, or they can be premixed and supplied to the treated surface together as a mixture or co-reaction product. The maximum amount of reaction of the silanes is less than that amount of condensation from the hydrolysis products which renders the condensation product insoluble in an aqueous solution which may or may not contain a water soluble solvent such as ethanol.

Illustrative of the diversity of organosilanes covered by formula (I) are the following:

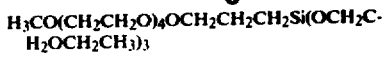

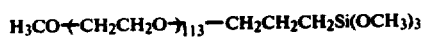

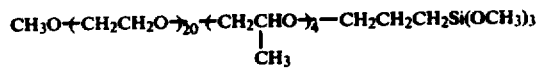

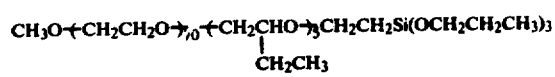

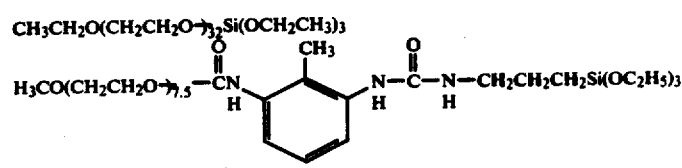

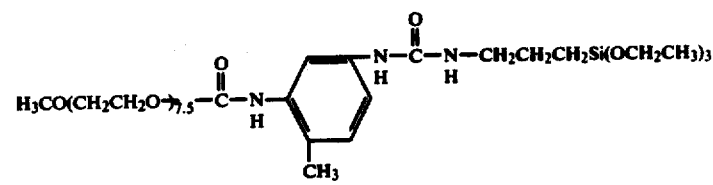

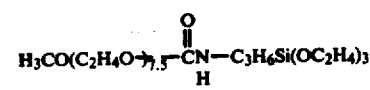

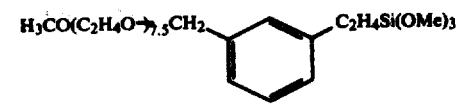

Suitable silanes of formula II useful in the practice of this invention include, by way of example only, the following:

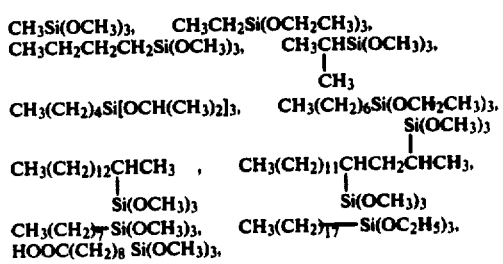

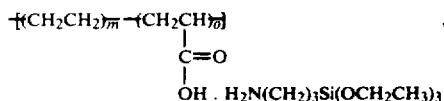

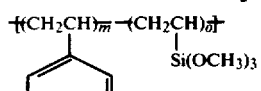

HOOCCH₂CH₂Si(OCH₂CH₃)₃, NCCH₂CH₂Si(OCH₂CH₃)₃,
H₂N(CH₂)₃Si(OC₂H₅)₃, H₂NCH₂CH₂NH(CH₂)₃Si(OCH₃)₃,
H₂N(CH₂)₄Si(OC₂H₅),
H₂NCH₂CH₂NHCH₂CH₂NHCH₂CH₂CH₂Si(OC₂H₅)₃,

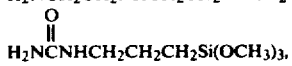

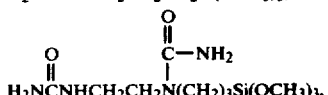

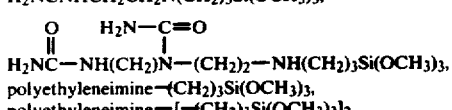

polyethyleneimine—(CH₂)₃Si(OCH₃)₃,
polyethyleneimine—[—(CH₂)₃Si(OCH₃)₃]₂,

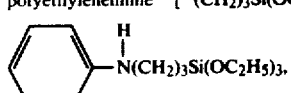

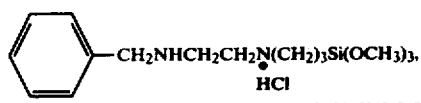

HOCH₂CH₂CH₂Si(OC₂H₅)₃, H₂NCH₂Si(OC₂H₅)₃,
HOCH₂Si(OCH₃)₃, H₂NCHCH₂Si(OC₂H₅)₃,
                                          |
                                          CH₃ polyazamide—[CH₂CH₂CH₂Si(OCH₃)₃]₁₋₅ (see U.S. Pat. No. 3,746,748, patented July 17, 1973, for a complete description of silylated polyazamides),
CH₂=C(CH₃)COO(CH₂)₃Si(OCH₃)₃,
CH₂=C(CH₃)COO(CH₂)₃Si(OCH₂CH₂OCH₃)₃,
CH₂=CHSi(OCH₃)₃, CH₂=CHSi(OCH₂CH₂OCH₃)₃,

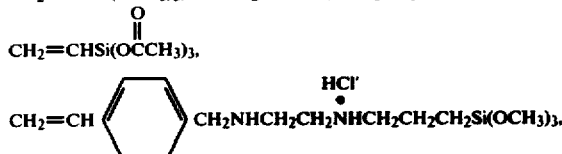

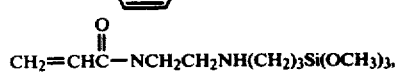

CH₂=CHCNH(CH₂)₃Si(OCH₂CH₃)₃,
CH₂=CHCH₂Si(OCH₂CH₂OCH₃)₃,

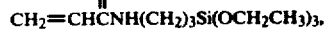

HSCH₃Si(OCH₃)₃, HSCH₂CH₂Si(OCH₂CH₃)₃,
HS(CH₂)₃Si(OCH₃)₃, HS(CH)₃Si(OCH₂CH₃)₃,

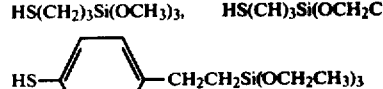

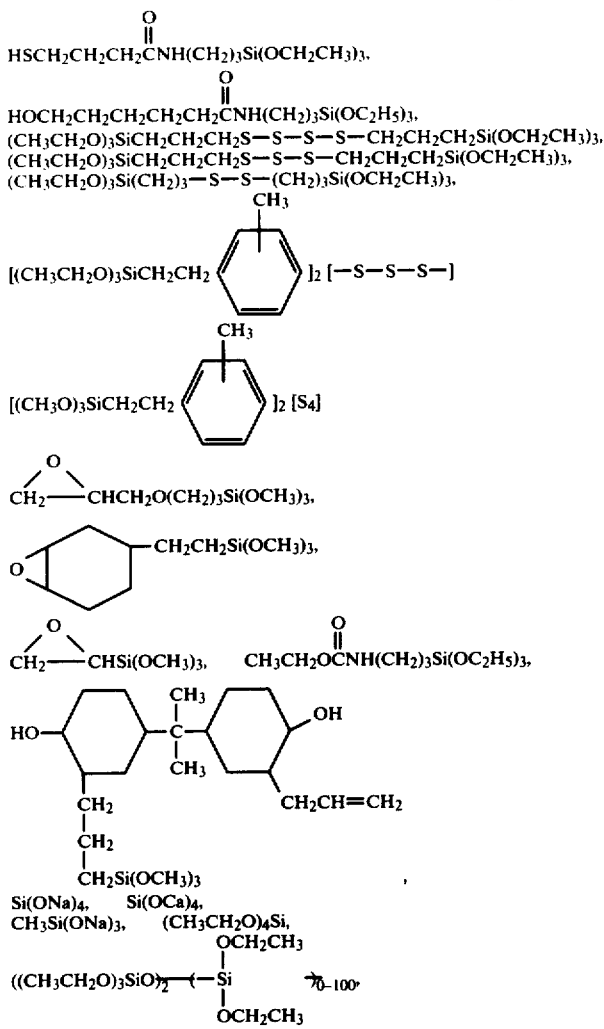

and the like.

For the purpose of this invention a number of terms should be defined herein and in the claims which follow. The term "particulate inorganic oxide" shall mean any inorganic solid material which possesses either oxygen (chemisorbed or covalently bonded) or hydroxyl (bound or free) at its exposed surface. In addition, the particulate inorganic oxide is a material which is suitable for use in the various molding or coating processes including injection molding, lamination, transfer molding, compression molding, coating (such as brushing, knife coating, roller coating, silk screen coating, printing, and the like), casting, and the like. For this reason it is desirably a material which has a limited length or width and in the typical cases does not have a length which, if it is spherical, exceeds 8 inches, and in most cases its length does not exceed 1 inch. Because of the variety of materials that are being attempted to be encompassed by the term particulate inorganic oxide, it is difficult to put a rigid construction on its definition. When the particulate inorganic oxide material is one which is classified as a filler or pigment, as those terms are normally construed, it may or may not be a reinforcing material. In most cases such fillers are irregular in their dimensions, some being elongated such that they have a length which exceeds a defined width. In the main, such inorganic oxides are regarded to be particles and their average particle size varies depending upon how they are to be employed. Some fillers, such as such fumed silicas and carbon black, have an average particle size less than about 0.1 microns. Other filler materials which may serve the purpose of providing either an abrasive or irregular surface to the composite to which it is being employed will have a much greater particle size, such as being capable of passing only a 10 mesh sieve, U.S. Standard.

The inorganic oxide substrate which can be effectively treated pursuant to this invention by the silane of formula (I) alone or combined with the silane of formula (II), includes those which are normally treated by Coupling Agents. In particular, the invention encompasses the treatment of potentially any inorganic oxide particulate material, as characterized above, which is employed in combination with thermosetting and/or thermoplastic resinous materials. In terms of this invention, the concept of a resinous material, whether it is thermosetting or thermoplastic, does not exclude the possibility that the material is in situ formed and therefore is derived from a monomeric material while in contact with an inorganic oxide material which contains or has provided at its surface the silane of formula (I) (or combined with the silane of formula (II)), its hydrolyzate or the condensate of that hydrolyzate. Specific illustrations of suitably employable inorganic oxide materials are, for example, brass (with an oxidized surface), copper metal (oxidized at its surface), aluminum metal (oxidized at its surface), iron or steel (oxidized at its surface), alumina, aluminum trihydrate, siliceous materials such as fumed silica, hydrated silica (precipitated silica), silica aerogels, silica xerogels, aluminum silicates, calcium magnesium silicate, asbestos, glass fibers, clays, molecular sieves, Wallostonite, calcium carbonate, carbon black (including lamp black), titanium dioxide (including titanium dioxide which contains HCl soluble alumina and/or silica), calcium sulphate, magnesium sulfate, calcium carbonate containing a silica coating or agglomerated to silica, and the like.

Because the aforementioned silanes do not serve a function that is equivalent to the function of a Coupling Agent, it would be improper to characterize them as a member of that class of materials and hence their role in providing strength is not such a factor as to make the size of the particulate inorganic oxide significant in the enjoyment of this invention. For that reason, the silanes of formula (I) are hereinafter to be termed a "Dispersion Promoter", that is, a material which makes the inorganic oxide or other particulate material more compatible or dispersible within the plastic or resin system in which it is supplied. In one sense the silanes used in this invention serve the function of a surface active agent and in another sense they possess the capacity of enhancing bonding between the inorganic oxide and the resin or plastic in which it is provided. Such bonding is effected by virtue of interface compatibility, and/or by way of associative or hydrogen bonding or through covalent bonding to the extent (generally a minimal factor) that the silane possesses organo functional moieties of the classical kind found in Coupling Agents.

One feature of the Dispersion Promoters of this invention is that they alter the surface characteristics of the inorganic oxide so that they are more readily and more thoroughly dispersed within the resin or plastic in which they are incorporated and this serves to enhance the appearance of the resulting composite and increase the overall strength of the composite when the particulate material employed is one which serves to reinforce the plastic or resin. This invention is concerned with surface treated particulates where the surface treatment is either the addition of the aforementioned Dispersion Promoters or its hydrolyzate or partial condensate of the hydrolyzate (or the cohydrolyzates or cocondensates thereof) to the surface of the inorganic oxide.

The amount of Dispersion Promoter provided upon the inorganic oxide particles, as characterized herein, is that amount which alters the surface characteristics of the particles so that they are more readily dispersed within the resin or plastic or other medium in which they are incorporated. Typically, the amount of the Dispersion Promoter [or its hydrolyzate or partial condensate of the hydrolyzate (or the cohydrolyzate or condensates thereof as characterized above in regard to the utilization of the silanes of Formula (II)-)—hereinafter collectively termed "its derivatives"] which is supplied to the inorganic oxide may be as little as 0.25 weight percent to as much as 90 weight percent, based upon the combined weight with the inorganic oxide particles. As a rule, about 0.5 to about 5 weight percent of the Dispersion Promoter and/or its derivatives is adequate for the purposes of appropriately alterating the surface characteristic of the inorganic oxide particles. However, greater concentrations may be used for purposes which exclude the simple utilization of the so treated inorganic oxide particles in plastics or resins. It has been determined that the so treated inorganic oxide particles when containing excessive amounts of the Dispersion Promoter and its derivatives can be utilized as "dry or semi-dry concentrates". In such as case, the particles are carriers for the Dispersion Promoter. In such embodiment of this invention, the particles containing this excessive amount of Dispersion Promoter (the "concentrates") can be mixed within appropriate proportions with untreated inorganic oxide particles and by simple dry blending techniques, the excessive Dispersion Promoter and/or its derivatives is transferred to the untreated particles whereby to effect uniform treatment of the particles with Dispersion Promoter and/or its derivatives. In this sense the concentrate loses its excessive quantity of Dispersion Promoter and/or its derivatives and the total mass of inorganic oxide particles is found to be coated with a relatively uniform concentration of Dispersion Promoter and/or its derivatives.

In some cases, the concentrate may be added directly to the plastic, resin, or other vehicle containing untreated inorganic oxide particles and by the "integral blending" technique the excess Dispersion Promoter and/or its derivatives is transferred to untreated inorganic oxide particles.

The Dispersion Promoter and/or its derivatives may be provided on the inorganic oxide particles by any of the known methods by which Coupling Agents are similarly supplied to particulate surfaces. Thus spraying the Dispersion Promoter while tumbling the particles or mixing the particles in a dilute liquid composition containing the Dispersion Promoter and/or its derivative represent adequate treating procedures.

The plastics and/or resin in which the inorganic oxide particles treated with the Dispersion Promoter and/or its derivatives include essentially any plastic and/or resin. Included in the definition of plastic are rubber compounds. The treated inorganic oxide particles may be supplied to the plastic and/or resin while the same is in any liquid or compoundable form such as a solution, suspension, latex, dispersion, and the like. It makes no difference from the standpoint of this invention whether the plastic contains solvent or nonsolvent, or the solvent is organic or inorganic exept, of course, it would not be desirable for any plastic or resin or any of the treated inorganic oxide to employ a solvating or dispersing medium which deleteriously affects the components being blended.

Suitable plastics and resins include, by way of example, thermoplastic and thermosetting resins and rubber compounds (including thermoplastic elastomers). The plastics and resins containing the treated particles of this invention may be employed, for example, for molding (including extrusion, injection, calendering, casting, compression, lamination, and/or transfer molding), coating (including laquers, film bonding coatings and painting), inks, dyes, tints, impregnations, adhesives, caulks, sealants, rubber goods, and cellular products. Thus the choice and use of the plastics and resins with the treated particles of this invention is essentially limitless. For simple illustration purposes, the plastics and resins may be alkyd resins, oil modified alkyd resins, unsaturated polyesters as employed in GRP applications, natural oils, (e.g., linseed, tung, soybean), epoxides, nylons, thermoplastic polyester (e.g., polyethyleneterephthalate, polybutyleneterephthalate), polycarbonates, polyethylenes, polybutylenes, polystyrenes, styrene butadiene copolymers, polypropylenes, ethylene propylene co- and terpolymers, silicone resins and rubbers, SBR rubbers, nitrile rubbers, natural rubbers, acrylics (homopolymer and copolymers of acrylic acid, acrylates, mathacrylates, acrylamides, their salts, hydrohalides, etc.), phenolic resins, polyoxymethylene (homopolymers and copolymers), polyurethanes, polysulfones, polysulfide rubbers, nitrocelluloses, vinyl butyrates, vinyls (vinyl chloride and/or vinyl acetate containing polymers), ethyl cellulose, the cellulose acetates and butyrates, viscose rayon, shellac, waxes, ethylene copolymers (e.g., ethylene-vinyl acetate copolymers, ethylene-acrylic acid copolymers, ethyleneacrylate copolymers), and the like.

The inorganic oxide particles treated with the Dispersion Promoter has greater affinity for water and as a consequence they are more readily dispersible in water containing systems. The treated particles are more readily incorporated in and stay dispersed longer and more uniformly in water containing systems such as latexes, water solutions, and water dispersions regardless of whether water is the continuous or discontinuous phase. In addition the Dispersion Promoter enhances the dispersibility of the treated inorganic oxides in organic solvents ranging from hydrocarbon liquids to highly polar organic liquids. As a result, treated inorganic oxides which possess catalytic activity, such as molecular sieves and bentonite, kieselguhr and Kaolin clays, can be more effectively employed in liquid suspension catalytic chemical reactions. Moreover, Dispersion Promoter treated inorganic oxides particles employed in pharmaceutical applications provide more stable suspensions in liquids lessening hard settling of the particles. For example, Kaolin clay treated with the Dispersion Promoter possesses enhanced dispersibility in water and is less prone to hard settling in a container left standing.

Though this invention has been described in great detail, the following examples are provided to demonstrate specific illustrations of the invention.

EXAMPLE 1

1135 grams of a precipitated alumina trihydrate, Al(OH)$_3$, of 1.0 micron particle size, such as Hydral™ 710 manufactured by the Aluminum Company of America, were charged to an 8 quart Patterson Kelly™ twin shell blender. With the shell rotating and the intensifier bar operating, 393.3 grams of each silane listed in Table 1 below were fed through the liquid entry port over a period of 15 minutes. The silane charge corresponded to about 25 percent by weight on the completed silane concentrate. An extra 15 grams of silane was included in the charge to compensate for liquid hold-up in the system. After all the silane was added, blending was continued for an additional 15 minutes with the intensifier bar operating.

TABLE 1

| Silane | Composition |
|---|---|
| A | $H_3CO(C_2H_4O)_{7.5}C_3H_6Si(OCH_3)_3$ |
| B | $H_3CO(C_2H_4O)_{113}C_3H_6Si(OCH_3)_3$ |
| C | $H_3CO(C_2H_4O)_{7.5}CN(H)-C_6H_3(CH_3)-NCNHC_3H_6Si(OC_2H_5)_3$ (with two C=O groups) |

TABLE 1-continued

| Silane | Composition |
|---|---|
| D | $H_3CO(C_2H_4O)_{7.5}CN(H)-C_3H_6Si(OC_2H_5)_3$ (with C=O) |
| E | $H_3CO(C_2H_4O)_{7.5}C_3H_6SC_3H_6Si(OCH_3)_3$ |
| F | $H_3CO(C_2H_4O)_{7.5}CH_2-C_6H_4-C_2H_4Si(OMe)_3$ |
| G | $H_2C=C(CH_3)-COOC_3H_6Si[(OC_2H_4)_{7.5}OCH_3]_3$ (with C=O) |

SILANE A

Preparation of $CH_3O(C_2H_4O)_{7.5}C_3H_6Si(OCH_3)_3$

Into a 1 liter 3 necked flask equipped with electric heating mantle, mechanical stirrer, thermometer, liquid dropping funnel and water cooled condenser is charged 398 gms., 1.0 mole, of $CH_3O(C_2H_4O)_{7.5}CH_2CH=CH_2$, prepared by reaction of CARBOWAX® Methoxy Polyethylene Glycol 350 (Made by Union Carbide Corporation, New York, N.Y., U.S.A.) with stoichiometric sodium methoxide and allyl chloride in toluene solution, and 30 parts per million (ppm) of platinum added as a 5% solution of $H_2PtCl_6 \cdot nH_2O$ (40% Pt) in isopropanol. By means of the dropping funnel, 149.0 gms., 1.1 moles, of $HSiCl_3$ is slowly added over a period of 1 hour beginning at 30° C. Heating is continued from 50° to 60° C. for 1 hour to complete reaction and excess unreacted $HSiCl_3$ is recovered by distillation to a final pot temperature of 100° C. There results about 533 gms., 1.0 moles, of $CH_3O(C_2H_4O)_{7.5}C_3H_6SiCl_3$ in near quantitative yield, which analyzes 5.5 meg./gm of silyl chloride acidity as measured by titration with a 0.1 N solution of sodium hydroxide. The latter chlorosilane adduct is treated over a period of 2 hours with excess methanol while heating at 70°-80° C. and maintaining continuous evacuation of by-product hydrogen chloride by means of a water aspirator. There results 520 gms., 1.0 mole, of $CH_3O(C_2H_4O)_{7.5}C_3H_6Si(OCH_3)_3$ in quantitative yield, containing less than 0.1 meg/gm titratable acidity.

SILANE B

Preparation of $CH_3O(C_2H_4O)_{113}C_3H_6Si(OCH_3)_3$

Starting with 250 gms., 0.05 moles of toluene diluted CARBOWAX Methoxy Polyethylene Glycol 5000 in a 1 liter, 3-necked flask equipped with thermometer, mechanical stirrer, electrical heating mantle and distillation head, successive treatment in the conventional manner with 0.065 moles of sodium methoxide and 5 gms., 0.65 moles of allyl chloride produces a 50 wt % toluene solution of the corresponding allyl ether capped derivative $CH_3O(C_2H_4O)_{113}CH_2CH=CH_2$. Subsequent reaction of 447 gms. of the latter with 5.4 gms., 0.0438 moles, of $HSi(OCH_3)_3$ in the presence of 0.057 gms. of $H_2PtCl_6$, diluted to 1.09 ml in isopropanol and 0.4 gms. of glacial acetic acid is continued at about 55° C. for two hours until complete. Toluene and other volatiles are removed by vacuum stripping to a final temperature of 60° C. The resulting product $CH_3O(C_2H_4O)_{113}C_3H_6Si(OCH_3)_3$ is diluted to 40 wt % solids in toluene.

SILANE C

Preparation of

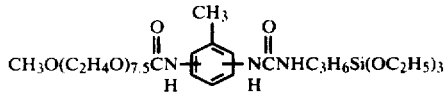

Into a 1 liter, 3-necked flask equipped with thermometer, mechanical stirrer, electric heating mantle and distillation head is charged 150 gms. toluene and 262.5 gms., 0.75 moles, of UCC CARBOWAX Methoxy Polyethylene Glycol 350. Distillation of 40 gms. of toluene is used to remove traces of contained moisture and thereupon is added 130.6 gms., 0.75 moles, of 80/20 isomeric mixture of 2,4 and 2,6-toluene diisocyanate over a period of 1 hour beginning at about 0° C. Stirring is continued for 1 hour as the reaction mixture slowly exotherms to about 15° C. and is finally warmed to about 28° C. By means of a liquid addition funnel is added 165.9 gms., 0.75 moles, of $NH_2(CH_2)_3Si(OC_2H_5)_3$, and external cooling is provided to maintain a maximum reaction temperature of 25° C. Additional toluene, 100 ml., is added to dissolve resulting solids that form. After stirring 1 hour to complete reaction, toluene is removed by vacuum stripping to a final condition of about 1 mm. of mercury pressure at 50° C. and the resulting 559 gms., 0.75 moles of

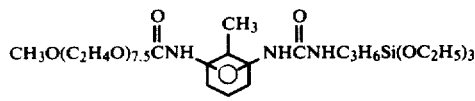

is observed as a waxy solid and is diluted with 50 wt % of anhydrous absolute ethanol.

SILANE D

Preparation of $CH_3O(C_2H_4O)_{7.5}\overset{O}{\overset{\|}{C}}NHC_3H_6Si(OC_2H_5)_3$ Into a 1 liter, 3-necked flask equipped as previously described for silane C is charged 297.5 gms., 0.85 moles of CARBOWAX Methoxy Polyethylene Glycol 350 and 130 gms. of toluene. After heating to 120° C. and distilling 40 gms. of toluene to insure removal of trace moisture, 210 gms., 0.85 moles of $O=C=N(CH_2)_3Si(OC_2H_5)_3$ containing 1 gm. of dissolved dibutyl tin dilaurate is slowly added over 1 hour beginning at 0° C. and finally reaching 25° C. Vacuum stripping to 1 mm. mercury pressure at 80° C. provides 507 gms. of

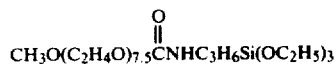

which is subsequently diluted to 75 wt % solids in anhydrous absolute ethanol.

SILANE E

Preparation of $CH_3O(C_2H_4O)_{7.5}C_3H_6SC_3H_6Si(OC_2H_5)_3$

Into a 1 liter, 3-necked flask equipped as previously described in Example C is charged 380 gms., 0.95 moles, of allyl ether of CARBOWAX Methoxy Polyethylene Glycol 350, 186.4 gms., 0.95 moles, of $HS(CH_2)_3Si(OCH_3)_3$ and 2.3 gms. of N,N-bis-azo-isobutyronitrile. Upon heating the stirred mixture to about 85° C., an exothermic heat rise to 120° C. is observed and maintained for about 1 hour. Upon cooling to 25° C. there results 566 gms., 0.95 moles of $CH_3O(C_2H_4O)_{7.5}C_3H_6SC_3H_6Si(OCH_3)_3$ which is diluted to 80 wt % solids with anhydrous absolute ethanol.

SILANE F

Preparation of

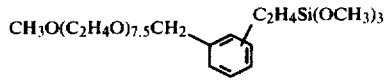

Starting with 315 gms., 0.9 moles of CARBOWAX Methoxy Polyethylene Glycol 350 and 100 ml. of toluene in much the same equipment set up as previously described for silane B, reaction with 0.9 moles of sodium methoxide by removing methanol provides the sodium salt derivative, $CH_3O(C_2H_4O)_{7.5}Na$. Slow addition of 247.4 gms., 0.9 moles, of

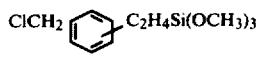

over 1 hour produces an exothermic heat rise from 50° to 90° C. and an increasing amount of finely dispersed NaCl. When reaction is complete, cool to 25° C., filter free of salt, remove toluene under vacuum to obtain 257 gms. of

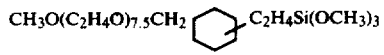

which is diluted to 80 wt % solids with anhydrous absolute ethanol.

SILANE G

Preparation of $CH_2=C(CH_3)\overset{O}{\overset{\|}{C}}OC_3H_6Si[(OC_2H_4)_{7.5}OCH_3]_3$ Into a liter, 3-nicked flask equipped with thermometer, mechanical stirrer, electric heating mantle distillation head and receiver assembly is charged 333 gms., 0.95 moles of CARBOWAX Methoxy Polyethylene Glycol 350, 236 gms., 0.95 moles, of

5.7 gms. of tetra-isopropyl titanate and 0.22 gms. of monomethyl ether of hydroquinone. Heat is applied to maintain a (maximum) reaction temperature of 100° C. over a period of 6 hours while retaining 19 gms. of methanol as distillate. Most of the remainder of [30.4 gms. theoretical] methanol is removed by vacuum stripping at 25° to 50° C. to a final condition below 1 mm. of mercury pressure. There results 538.6 gms. of

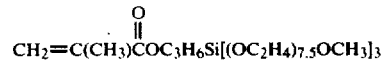

which is diluted with anhydrous absolute ethanol to 80 wt % solids.

EXAMPLE 2

Separate quantities of 3456 grams of alumina trihydrate of 6 to 9 micron particle size, such as Alcoa C-331 or Great Lakes Foundry Sand GHA-331, were combined with 144 grams of each of the dry silane concentrates described in Example 1 above. The mixtures were each blended for two hours in the twin shell blender and stored for subsequent testing. The average silane concentration in each of the mixtures was 1.0 weight percent.

For comparative purposes, 5, 15 and 25 percent of the 1 micron alumina trihydrate (Hydral 710) without any silane was blended with the 6 to 9 micron alumina trihydrate (GHA-331).

EXAMPLE 3

Separate quantities of 200 grams of Marco ™ GR 13021 Polyester Resin* (Sold by W. R. Grace & Co.) were weighed into a one pint tin lined can. 350 grams (175 phr) each of the alumina trihydrate fillers, as characterized in Table 2 below, were slowly added to the resin with gentle hand stirring to promote wetting of the filler by the resin. When all of the filler had been added, the can was covered and mixed with an electrically powered Jiffy ™ Mixer Blade (Model LM, Jiffy Mixer Co.) for 15 minutes.

* Based upon infrared and nuclear magnetic residence analysis, an idealized segmented chemical representation of this resin, deduced from calculated mole ratios of phthalate, fumarate, 1,3 butane diol and ethylene glycol (as ester groups) is

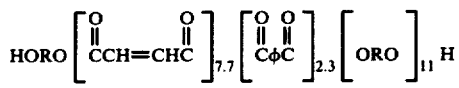

in which ORO diol units = 1.8/1.0 mole ratio of 1,3 butane diol/ethylene glycol. The resin contains styrene monomer.

The can of resin-filler mix was conditioned in a constant temperature water bath controlled at 90° F. ±1° F. for two hours. Viscosity of the mix was then determined with a Brookfield ™ Synchro-Electric Viscometer ™ Model HBT, using spindle No. 4 which had also been similarly conditioned for two hours at 90° F.

TABLE 2

| Experiment No. | Filler mixed with resin | Viscosity, 10 RPM $10^3$ cps |
|---|---|---|
| a. | Untreated alumina Trihydrate (GHA-331) | 78.4 |
| b. | 75 wt. % GHA-331/25 wt. % Hydral 710 from Example 2 | 60.0 |
| c. | 85 wt. % GHA-331/15 wt. % Hydral 710 from Example 2 | 44.0 |
| d. | 96 wt. % GHA-331/5 wt. % Hydral 710 from Example 2 | 56.0 |
| e. | 96 wt. % GHA-331/4 wt. % Hydral 710 containing 25% Silane A from Example 2 | 28.8 |

These data show the well known viscosity lowering effect of filler packing and that a minimum viscosity with untreated Hydral 710 is achieved at 15 percent in a blend with GHA-331.

But the presence of Silane A on the Hydral 710 carrier reduces viscosity by a factor of 2.

EXAMPLE 4

The alumina trihydrate fillers from Example 3 were compared in the following bulk molding compound (BMC) formulation:

| Component | Description | Parts by Weight | Grams |
|---|---|---|---|
| Marco$^{TM}$ GR 13021[1] | Unsaturated polyester resin in styrene monomer | 80. | 200. |
| BAKELITE$^{TM}$ LP-40A[2] | Low profile additive: an acrylic acid modified ploy (vinyl acetate)in styrene monomer. | 20. | 50. |
| Zinc Stearate | Mold release agent | 2. | 7.5 |
| Tert butyl perbenzoate | Cross-linking catalyst | 1. | 2.5 |
| GHA-331[3] (See Table 3 below) | Al(OH)$_3$ 6.5-8.5 avg. particle size | 275. | 687.5 |
| Glass P-265A[4] × 1 | ¼"chopped glass strand | 76.3 | 190.7 |

[1]W.R. Grace & Co., Polyester Division - Marco
[2]Union Carbide Corporation
[3] Great Lakes Foundry Sand Co., Mineral Products Division
[4]Owens-Corning Fiberglass Corporation The procedure for compounding the formulation was as follows.

The resin, low profile, additive, zinc stearate, and t-butyl perbenzoate were preblended in a one pint wide mouth jar with an air driven "Lightnin" mixer and Jiffy ® stirring blade which consisted of a horizontal two bladed propeller with guard ring, and two vertical blades. Care was taken to insure complete dispersion of the zinc stearate in the mutually soluble resin and low profile additive.

The liquid pre-blend was transferred to the (1 gallon) bowl of a Hobart ™ N-50 mixer equipped with a dough hook. The 687.5 g of Al(OH)$_3$ was added in each instance in one charge with the mixer stopped. The mixer was then run at speed number one for exactly six minutes. During this period the time for the untreated and treated Al(OH)$_3$ fillers to be completely wetted by and dispersed in the liquid phase was recorded and set forth in Table 3.

TABLE 3

| Experiment NO. | Alumina Trihydrate | Time for Wet Out and Dispersion in Liquid Phase, seconds |
|---|---|---|
| a. | Untreated GHA-331 | 180 |
| b. | 85 wt. % Untreated GHA-331/15 wt. % Hydral 710 from Example 2 | 160 |
| c. | 96 wt. % untreated GHA-331/4 wt. % Hydral 710 containing 25% Silane A from Example 2 | 60 |

With the mixer stopped, the filled resin was scraped from the sides of the bowl, down into the center, and the first increment of glass charge was added around the wall of the bowl to prevent resin from readhering. The mixer was then run at speed number one and the entire 190.7 gram glass charge added in exactly two minutes. Mixing was continued another two minutes for a total mixing time of four minutes. Commercial practice is to minimize mixing to avoid fiber degradation. The compound was then molded into test plaques.

Test plaques were prepared by charging 400 grams of the above compounds to a single cavity 8"×8"×0.125", chrome plated mold. Top and bottom surfaces were lined with 0.003" thick MYLAR ® film.

Press cycle was two minutes at 300° F. under 40 tons of force.

The resulting plaques were examined visually for uniformity of glass dispersion. The pronounced dark gray swirl pattern with untreated alumina trihydrate is glass. The lighter areas are resin-rich, resulting from incomplete dispersion of glass during mixing in the Hobart and/or "washing" of the resin from the glass as the compound flowed in the mold. Thus, the less the visual contrast in a plaque, the better the uniformity of glass dispersion.

A visual qualitative assessment of glass dispersion is set forth in Table 4 which is keyed to the experiment numbers of Table 3.

TABLE 4

| Experiment Nos. | Alumina Trihydrate | Dispersion Quality |
|---|---|---|
| a. | Untreated GHA-331 | Fair |
| b. | 85 wt. % untreated GHA-331/ 15 wt. % Hydral 710 from Example 2 | Fair |
| c. | 96 wt. % untreated GHA-331/ 4 wt. % Hydral 710 containing 25% Silane A from Example 2 | Good |

The molded plaques were sawed into $3'' \times 0.5'' \times 0.161$-$0.233''$ thick test specimens (depending on plaque thickness). Five specimens per plaque were selected randomly for flexure testing by ASTMD 790-71 and the results are shown below:

| Alumina Trihydrate | Flexural Strength, psi | Standard Error, % |
|---|---|---|
| Untreated GHA-331 | 8,070 | 27 |
| 96 wt. % untreated GHA-331/ 4 wt. % Hydral 710 containing 25% Silane A from Example 2 | 12,334 | 13 |

The reduced standard error is additional evidence of improved plaque uniformity with silane treated alumina trihydrate. The definition for "standard error" can be found in Rickmers et al., *Statistics, An Introduction*, page 22 (1967), published by McGraw-Hill Book Company, New York, N.Y.

EXAMPLE 5

Separate quantities of 1816 grams of GHA-331 were charged to an 8 quart Patterson Kelly Liquid-Solid ("twin-shell") Blender. With the blender and intensifier rotating, 150 ml of treating solution of compositions described below were gravity fed, via separatory funnel, to the inlet tube over a period of approximately 15 minutes. The blender and intensifier were allowed to run another 15 minutes to assure adequate liquid-solid dispersion and to minimize agglomerate formation.

The treated contents of the blender were spread to a one inch depth in a $14 \times 18$ inch tray and dried for one hour at 100° C.

Each treating solution was prepared by diluting 18.16 grams of one of the silanes described in Example 1 to 150 ml with a 10 volume % water - 90 volume % methanol solution which was mixed for about 10 minutes before feeding to the twin shell blender.

EXAMPLE 6

Resin-alumina trihydrate mixtures and viscosity measurements were made as in Example 3, except that a Brookfield Model RVT Viscometer with a No. 6 Spindle was used. The following viscosisty data with silane treated filler from Example 5 show the effectiveness of silylated polyethers in viscosity reduction. Comparison of Silane A performance with that of its polyether intermediate shows the contribution of the silane moiety.

| Alumina Trihydrate Filler Pretreatment (1 wt. %) | Resin-Filler Viscosity at 10 RPM, $10^3$ cps | |
|---|---|---|
| | Run #1 | Run #2 |
| None (Control) | 66.7 | 86.5 |
| Silane A | 17.8 | — |
| $H_2C=CHCH_2O(C_2H_4O)_{7.5}CH_3$ (used to make A) | 50.5 | — |
| Silane B | 37 | 34.0 |
| Silane C | — | 64.5 |
| Silane D | — | 44.0 |
| Silane E | — | 36.5 |
| Silane F | — | 38.5 |
| Silane G | — | 53.0 |

EXAMPLE 7

The pretreated alumina trihydrate fillers of Example 5 were compounded into the bulk molding compounds of Example 4. The effectiveness of Silanes A-F and the effectiveness of Silane A over its polyether precursor are shown below.

| Silane on Alumina Trihydrate | Filler Wetout Time, sec. | Glass Dispersion Uniformity | Flexural Strength psi | Run No. |
|---|---|---|---|---|
| None | 240 | Poor | 7,570 | 1 |
| Silane A | 90 | Good | 10,450 | 1 |
| $H_2C=CHCH_2O(C_2H_4)_{7.5}CH_3$ | 120 | Fair | 8,625 | 1 |
| None | 165 | Poor | 8,700 | 2 |
| Silane B | 75 | Good | 11,300 | 2 |
| Silane C | 140 | Poor | 10,800 | 2 |
| Silane D | 70 | Fair | 9,900 | 2 |
| Silane E | 70 | Fair | 10,000 | 2 |
| Silane F | 85 | Good | 8,100 | 2 |
| Silane G | 125 | Fair | 9,800 | 2 |

Silane C reduces wet out time and improves flexural strengths. In the case of Silane C the magnitude of wet out time reduction would be greater and glass dispersion would be better if the ethylene oxide chain length were increased to compensate for the hydrophobic effect of the tolyl urethane moiety.

EXAMPLE 8

The dry silane concentrate (DSC) consisted of 25.0 wt % the silane composition of one (1) mole of $H_2C=C(CH_3)COO(CH_2)_3Si(OCH_3)_3$ and two (2) moles of $(H_3CO)_3Si(CH_2)_3(OC_2H_4)_{7.5}OCH_3$, mole ratio of 1:2, on Hydral 710. This was accomplished by first "fluffing" the Hydral 710 in a twin shell blender which amounted to breaking up any clumps with the high speed intensifier bar and thereby increasing the surface area. The Hydral 710 was then transferred to a Hobart mixing bowl (1 gallon) where the appropriate amount (25 wt%) of the silane composition was applied neat by means of hand spraying and mixing. After complete application of the silane composition, the alumina trihydrate was returned to the twin shell blender to break up any clumps which might have formed. A blend was made by placing, in a twin shell blender, the appropriate amount of DLC and untreated GHA-331 which would equal 1.0 wt % of the silane composition based on total alumina trihydrate weight. The blender was then run for 10 minutes and the alumina trihydrate was removed.

EXAMPLE 9

The following formulation was employed to make a bulk molding compound (BMC):

The pre-blend was transferred to the mixing bowl of a Hobart N-50 mixer equipped with a dough hook. In the separate evaluations, untreated alumina trihydrate, pretreated alumina trihydrate and blend of DSC and untreated alumina trihydrate from Example 8 were added, in each case, in one charge (687.5 gm.) to the mixer bowl with the mixer stopped. The DSC and untreated alumina trihydrate which were not dry blended together were added to the liquid phase separately. The DSC was added first and mixed until it was completely wetted at which time the mixer was stopped and the untreated alumina trihydrate was added. Mixing continued until the running time of the mixer totaled six minutes. The mixer was run at speed 1 and six minutes was the standard mixing time for all fillers. During this period, the time for the filler to wet out and disperse in the liquid phase was recorded and set forth in Table 5 below.

TABLE 5

|  | UNTREATED | INTEGRAL BLEND | ALL GHA-331 PRETREATED | DSC DRYBLENDED WITH GHA-331 | DSC & GHA-331 ADDED SEPARATELY | |
|---|---|---|---|---|---|---|
| Viscosity, $10^3$cps Brookfield RVT 10 RPM No. 6 Spindle 32° C. | 62.5 75 | 55 — | 42 — | 34.5 — | — 46 | |
| Time for Resin to Wet Filler (seconds) | 180 | 180 | 90 | 90 | 180 | After DSC dispersed, required 120 sec. to wet filler. |
| Dispersion of glass in filled resin | WORST | POOR | GOOD | GOOD | POOR | |

| Component | Parts by Weight | Grams |
|---|---|---|
| Marco GR 13021 polyester[1] | 80 | 200 |
| Bakelite LP-40A[2] | 20 | 50 |
| Zinc Stearate | 3 | 7.5 |
| Tertiary butyl perbenzoate | 1 | 2.5 |
| GHA-331[3] | 275 | 687.5 |
| OCF P-265A × 1[4] ¼" chopped fiberglass strand | 76.3 | 190.7 |

[1]W.R. Grace & Co., Polyester Division - Marco
[2]Union Carbide Corporation
[3]Great Lakes Foundry Sand Co., Mineral Products Division
[4]Owens-Corning Fiberglass Corporation Compounding procedure: The polyester resin, low profile additive, zinc stearate and t-butyl perbenzoate were pre-blended in a one pint wide mouth jar by means of an air driven "Lightnin" mixer equipped with a Jiffy ® stirring blade consisting of a horizontal two bladed propeller with guard ring and two vertical blades. In the case of integral blend, the silane composition of Example 8 was added at this time. Complete wetting and dispersion of the zinc stearate was the major concern in the blending of these components.

After the mixing of resin and filler, the sides of the bowl were scraped and the material collected in the center. A portion of the glass charge was spread around the sides of the bowl to stop the resin-filler mix from readhering. The mixer was turned on and run at speed 1 for 4 minutes. The remainder of the glass charge was added within the first 2 minutes of mixing. Composites were molded from the completed compound.

Test composites were prepared by placing 400 grams of bulk molding compound into single cavity, 8"×8"×0.125", chrome plated mold. Mold surfaces were separated from the bulk molding compound by sheets of 0.003" thick MYLAR ® film. Composites were pressed under 40 tons of force for 2 minutes at 300° F.

Composites were reduced to 6"×6" by removing the outside inch of material from all sides. Ten 3"×0.5"×0.181"–0.232" thick test specimens (depending on composite thickness) were cut from each composite.

Five test specimens were selected randomly for dry flexural testing. The remaining five specimens were immersed in boiling water for eight hours. Testing was done in accordance with ASTM 790-71. The results are set forth in Table 7 below.

TABLE 7

|  | UNTREATED | | INTEGRAL BLEND | | ALL ATH PRETREATED | | DLC DRYBLENDED WITH ATH | | DLC & ATH ADDED SEPARATELY | |
|---|---|---|---|---|---|---|---|---|---|---|
|  | Dry | Wet | Dry | Wet | Dry | Wet | Dry | Wet | Dry | Wet |
| Flexural strength, psi: | 8300 | 8000 | 94000 | 6100 | 10700 | 7900 | 12300 | 11600 | 10500 | 7600 |
| Standard Error, % | 18.6 | 20.7 | 10.6 | 12.6 | 13.8 | 9.1 | 5.5 | 11.5 | 17.8 | 18.0 |
| Flexural | $2.15 \times 10^6$ | $1.90 \times 10^6$ | $2.24 \times 10^6$ | $1.7 \times 10^6$ | $2.23 \times 10^6$ | $1.79 \times 10^6$ | $2.25 \times 10^6$ | $1.79 \times 10^6$ | $2.21 \times 10^6$ | $1.67 \times 10^6$ |

TABLE 7-continued

| | UNTREATED | | INTEGRAL BLEND | | ALL ATH PRETREATED | | DLC DRYBLEND-ED WITH ATH | | DLC & ATH ADDED SEPARATELY | |
|---|---|---|---|---|---|---|---|---|---|---|
| | Dry | Wet | Dry | Wet | Dry | Wet | Dry | Wet | Dry | Wet |
| Modulus, psi; Standard Error, % | 8.75 | 5.35 | 5.9 | 8.0 | 5.8 | 5.5 | 4.5 | 4.0 | 4.8 | 4.9 |

EXAMPLE 10

Silane A is shown in the following to be effective in water borne coatings:

Water Reducible Polyester (Water free grind)

| Grind Mix (in 1 pint can) | #1 System (parts by weight) | #2 System (parts by weight) |
|---|---|---|
| Cargill 7201-80[1] | 135.8 | 135.8 |
| Ti Pure R-960[2] (titanium dioxide) | 135.0 | 135.0 |
| Silicone Emulsifier* (10% in Butyl Cellosolve ®) | 4.35 | 4.35 |
| Silane A | | 1.35 |
| Conditions: | | |
| High Speed Mixer (Saw tooth disc impeller 1¾" dia. at 6000 rpm) | 5 minutes | 5 minutes |

[1]Cargill Inc., Chemical Products Div., Minneapolis, Minn.; an oil free polyester, solid content 80% by wt., in normal butanol., visc. (25° C.) $Z_{2}$-$Z_{4}$ (Gardner Scale), Acid No. of solution is 40-48 mg of KOH/gm of sample.
[2]E.I. du Pont de Nemours & Co.; rutile grade containing $Al_2O_3$ and $SiO_2$ surface treatments.
*$(CH_3)_3Si[(CH_3)_2SiO]_{13}[CH_3SiO((OCH_2CH_2)_{17.5}OCH_3)]_{5.5}Si(CH_3)_3$ Add the following to Grind Mix with mixing

| Dimethyl ethanol amine | 10.0 | 10.0 |
|---|---|---|
| Cymel 303[3] | 27.0 | 27.0 |
| 2-ethyl hexanol | 0.5 | 0.5 |
| n-butanol | 3.5 | 3.5 |
| Troy Latex Anti-crater[4] | 0.65 | 0.65 |
| Deionized Water | 216.7 | 216.7 |

Then applied the resulting coating to 24 gage cold rolled steel bonderite ® 1000 panel - 6 mils (wet), 1 mil (dry), air dried for 5 minutes, and baked the panels at 175° C. for 15 min. in a forced circulation oven. The gloss of the baked panel was taken -

| Gloss - 60° | 76 | 94 |
|---|---|---|
| (ASTM-523D) 20° | 30 | 79 |

[3]American Cyanamid Company; hexamethoxymethylmelamine.
[4]Troy Chemical Corp., Newark, N.J./ proprietary composition.

Hiding power—6 mils (wet) of #2 is equivalent in hiding to 8 mils (wet) of #1 when drawn down on Morest TM hiding power charts (form 05) (Morest Company, Freeport, N.Y.)

By increasing the grinding time from 5 minutes to 15 minutes, the following results were obtained:

| | #1 System | #2 System |
|---|---|---|
| Gloss - 20% (ASTM-523D) | 67 | 79 |

The use of Silane A is effective in providing high gloss in water reducible enamels. It also reduced the grinding time to obtain high gloss and provided improved hiding power or increased pigment efficiency at the same time.

It was observed that conventionally manufactured aged water reducible enamels tended to produce a reduced gloss on application to panels.

Water Reducible Polyester (Water based grind)

| | System (parts by weight) | | |
|---|---|---|---|
| Grind Mix | 1 | 2 | 3 |
| Ti Pure R-900[1] (titanium dioxide) | 177.3 | | 177.3 |
| Treated $TiO_2$* | | 179.1 | |
| Silane A | | | 1.77 |
| Arolon 465[2] (acid terminated polyester | 60.2 | 60.2 | 60.2 |
| Deionized Water | 109.9 | 109.9 | 109.9 |
| Conditions: | | | |
| Pebble Mill (¼ × ¼ inch ceramic cylinders) | 20 hrs. | 20 hrs. | 20 hrs. |

[1]E.I. duPont de Nemours & Co., rutile grade containing $Al_2O_3$ surface treatment.
[2]Ashland Chemical Co., Div. of Ashland Oil Inc., Columbus, Ohio, - a water reducible oil free polyester; 70 wt. % solids in $H_2O$ - monobutyl ether of ethylene glycol mixture.

Then the following was added to the Grind Mix

| Arolon 465[2] | 166.7 | 166.7 | 166.7 |
|---|---|---|---|
| Cymel 301[3] | 40.7 | 40.7 | 40.7 |
| Butyl Cellosolve ® | 6.4 | 6.4 | 6.4 |
| Silicone Emulsifier[4] (10% in Butyl Cellosolve ®) | 5.0 | 5.0 | 5.0 |
| Deionized Water | 4.3 | 4.3 | 4.3 |
| Dimethyl ethanol amine | 1.0 | 1.0 | 1.0 |

Apply to 1000 Bonderite$^{TM}$ 5 mils (wet), air dry 5 minutes and then bake at 175° C. - 20 min.

| Gloss - 20° (ASTM 523D) | 77 | 84 | 83 |
|---|---|---|---|

*R-900 directly treated with a mixture of 0.75 weight % Silane A & 0.25 weight % beta-(3,4-Epoxycyclohexyl)ethyltrimethoxysilane.
[3]American Cyanamid Company; hexamethoxymethylmelamine.
[4]$(CH_3)_3Si[(CH_3)_2SiO]_{13}[CH_3SiO((OCH_2CH_2)_{17.5}OCH_3)]_{5.5}Si(CH_3)_3$ 5 met mils of Systems 2 & 3 are equivalent to 6 mils of System 1 in hiding using Morest charts.

Both the integral blend use of Silane A and the direct application of the silane to dry pigment are effective in improving the gloss and hiding of this type of water reducible polyester.

Latex Coatings

| Grind Mix in 500 cc. stainless steel beaker | (parts by weight) | | | |
|---|---|---|---|---|
| | 1 | 2 | 3 | 4 |
| Distilled Water | 200 | 200 | 200 | 200 |
| Potassium tripolyphosphate | 8 | 8 | 8 | |
| Igepal CA-630[1] (nonionic surfactant) | 8 | 8 | 8 | 8 |
| Ethylene glycol | 80 | 80 | 80 | 80 |
| Merbac 35[2] | 6 | 6 | 6 | 6 |
| Foamaster W-14[3] | 6 | 6 | 6 | 6 |
| Ti Pure R-900 | 840 | | 840 | 840 |
| Treated $TiO_2$* (see above) | | 848 | | |
| Silane A | | | 8.4 | 8.4 |
| Ammonium Hydroxide (28%) | | | 8 | |
| Citric Acid | | | | 10 |
| High Speed Mixer (same as above) Grind 15 min. and then added distilled water. | 132 | 132 | 132 | 132 |

[1]GAF Corp. N.Y., N.Y.; octylphenoxypoly(oxyethylene) ethanol. 9 moles ethylene oxide/mole of octyl phenol.
[2]Merck and Co., Rahway, N.J.; benzylbromoacetate.
[3]Diamond Shamrock Chemical Co., Morristown, N.J.; proprietary chemical, antifoam agent.

Mix Slowly

| Above Grind Base | 320 | 320 | 320 | 320 |
|---|---|---|---|---|

| -continued | | | | |
|---|---|---|---|---|
| Ucar 4358[4] | 660 | 660 | 660 | 660 |
| Butyl Carbitol ® | 16 | 16 | 16 | 16 |
| Dibutyl phthalate | 9 | 9 | 9 | 9 |
| Ammonium Hydroxide (28%) | 2 | 2 | | 2 |
| Foamaster W-14 (see above) | 1.5 | 1.5 | 1.5 | 1.5 |
| Acrysol G-110 (11%)[5] | 22 | 22 | 22 | 22 |
| Adjust to pH 8.6–8.7 | | | | |
| Draw down 5 mils (wet) on glass | | | | |
| Air Dry | | | | |
| Gloss - 20° | 28 | 29 | 34 | 46 |
| (ASTM 523D) | | | | |
| 60° | 67 | 67 | 72 | 76 |

[4]Union Carbide Corporation Acrylic polymer, 45% solids, 0.15 micron particle size (ave.), Tg 25° C.
[5]Rohm & Haas Co., Phila., Pa. - ammonium polyacrylate solution, thickener, 22% solids in $H_2O$, pH - ≈9.

3 system and #4 system grinds were adjusted to be on the alkaline and acid side respectively to aid hydrolysis of the silane. All final mixes were adjusted to a pH of 8.6–8.7 with ammonia.

Hiding power chart tests showed 5 mils (wet) drawdowns of systems #2, #3, & #4 to be equivalent to 6 mils (wet) of #1 without silane A, showing improvements in gloss and hiding in the latex systems containing Silane A.

Solvent Based Coatings

Silane A was found to offer gloss and hiding power advantages in solvent base systems. The following systems were prepared by pebble mill.

| | (parts by weight) | | |
|---|---|---|---|
| Grind Portion (16 hours) | 1 | 2 | 3 |
| Toluene | 100 | 100 | 100 |
| R-900 | 100 | 100 | 100 |
| Lexinol AC-1 (lecithin) | 1.0 | 1.0 | — |
| Silane A | — | 1.0 | 1.0 |
| Letdown Portion (1 hour) | | | |
| VMCC[1] Solution* | 320 | 320 | 320 |
| 7 mil (wet) film on | | | |
| Bonderite ® 1000 | | | |
| 24 hr. air dry gloss | | | |
| (ASTM 523D) - 60 | 31 | 82 | 67 |

*VMCC[1] - 100 pbw, diisodecylphthalate - 20 pbw, methyl isobutyl ketone - 150 pbw, toluene - 50 pbw.
[1]Union Carbide Corporation; terpolymer of 83 wt. % vinyl chloride, 16 wt. % vinyl acetate and 1 wt. % interpolymerized acid.

Hiding power charts showed that 6 mils of sytem −2 were equivalent to 7 mils of system −1, therefore Silane A added improvement in gloss and hiding power in solvent systems.

Titanium Dioxide Slurry Treatment

Simulated process treatment of $TiO_2$ slurries with Silane A resulted in dry product which provided improved gloss and hiding power when evaluated in water reducible polyester enamels. R-900 and $TiO_2$ containing 0.3% alumina were evaluated by Silane A treatment in slurry to simulate plant procedures in making $TiO_2$ pigment where the pigment is treated in a slurry, after hydroseparation of large particles, by coating in the slurry, flocculating the pigment, making a filter cake which is dried and micronized.

The stepwise Silane A procedure used to slurry treat the titanium dioxide was as follows:
To 283 grams of distilled water
add 6 mls 25% (wt) sulfuric acid
add 200 grams of $TiO_2$ with agitation to pH 3.2
add required amount of Silane A. Mix for 30 min.
Adjust pH to 5.5 with potassium hydroxide solution
filter on vacuum filter
Wash cake with water to remove salts
Oven dry at 105° C. for 1–2 hrs.
Sift dry product thru a 60 mesh screen and evaluate in the following system:

| Water Reducible Polyester (Water based grind) | | | | |
|---|---|---|---|---|
| | System (parts by weight) | | | |
| Grind | 1 | 2 | 3 | 4 |
| Ti Pure R-900 ($TiO_2$) as received | 177.3 | | | |
| Slurry Treated $TiO_2$ - no silane | | 177.3 | | |
| Slurry Treated $TIO_2$ - 1% Silane A | | | 179.1 | |
| Slurry Treated $TiO_2$ - 3% Silane A | | | | 182.8 |
| Arolon 465 | 60.2 | 60.2 | 60.2 | 60.2 |
| Deionized Water | 109.9 | 109.9 | 109.9 | 109.9 |
| Pebble Mill | 4 hrs | 4 hrs | 4 hrs | 4 hrs |
| Hegman ® Grind (ASTM D-1210) | 7+ | 7+ | 7+ | 7+ |
| Add the following | | | | |
| Arolon 465 | 166.7 | 166.7 | 166.7 | 166.7 |
| Cymel 301 | 40.7 | 40.7 | 40.7 | 40.7 |
| Butyl Cellosolve | 6.4 | 6.4 | 6.4 | 6.4 |
| Silicone Emulsifier (10% in Butyl Cellosolve) ®* | 5.0 | 5.0 | 5.0 | 5.0 |
| Deionized Water | 4.3 | 4.3 | 4.3 | 4.3 |
| Dimethyl ethanol amine | 1.0 | 1.0 | 1.0 | 1.0 |
| *see above | | | | |
| Apply to 1000 Bonderite 5 mils (wet) then baked at 175° C. for 20 min. | | | | |
| Gloss (ASTM 523D) - 20° | 75 | 77 | 75 | 80 |

Morest hiding power charts show that 5 mils of #4 are equivalent to 6 mils of #1, 2 & 3. Therefore #4 made with 3% silane slurry treated $TiO_2$ provides coatings with higher gloss and hiding power. The lack of positive results with #3 indicates that the slurry procedure has to be optimized to quantitatively deposit the silane on the pigment since 1% was effective in previous work where the silane was added directly to the pigment or "in-situ" as a paint additive.

99.7% $TiO_2$ (0.3% alumina) was treated similarly except that the control was used as received and mix #2 was made with 1% direct treatment for comparison with slurry treated titanium dioxide. The following results were obtained:

| Water Reducible Polyester (Water based grind) | | | | |
|---|---|---|---|---|
| | System (parts by weight) | | | |
| Grind | 1 | 2 | 3 | 4 |
| 99.7% $TiO_2$ (0.3% alumina) | 177.3 | | | |
| Direct Treated $TiO_2$-1% Silane A | | 179.1 | | |
| Slurry Treated $TiO_2$-1% Silane A | | | 179.1 | |
| Slurry Treated $TiO_2$-3% Silane A | | | | 182.8 |
| Arolon 465 | 60.2 | 60.2 | 60.2 | 60.2 |
| Deionized Water | 109.9 | 109.9 | 109.9 | 109.9 |
| Pebble Mill | 4 hrs | 4 hrs | 4 hrs | 4 hrs |
| Hegman ® Grind | 7 | 7+ | 7+ | 7+ |
| Add the following | | | | |
| Arolon 465 | 166.7 | 166.7 | 166.7 | 166.7 |
| Cymel 301 | 40.7 | 40.7 | 40.7 | 40.7 |
| Butyl Cellosolve | 6.4 | 6.4 | 6.4 | 6.4 |
| Silicone Emulsifier (10% in Butyl Cellosolve)* | 5.0 | 5.0 | 5.0 | 5.0 |
| Deionized Water | 4.3 | 4.3 | 4.3 | 4.3 |
| Dimethyl ethanol amine | 1.0 | 1.0 | 1.0 | 1.0 |
| Apply to 1000 Bonderite 5 mils (wet) Bake at 350° F. - 20 min. | | | | |
| Gloss - 20° | 50 | 81 | 71 | 73 |

Hiding power—5 mils of #4 (3% silane) was equivalent to 6 mils of #1, 2 & 3.

The above was repeated by grinding for 12 hrs. To improve dispersion which gave the following results:

| Gloss 20° | 61 | 82 | 78 | 80 |
| --- | --- | --- | --- | --- |

Viscosity of the finished paints were also measured to determine the effect of the silane treatment.

|  | #1 | #2 | #3 | #4 |
| --- | --- | --- | --- | --- |
| Viscosity - Brookfield |  |  |  |  |
| 6 RPM (cps) | 3240 | 2100 | 1740 | 1500 |
| 60 RPM (cps) | 1152 | 750 | 736 | 650 |
| 6/60 viscosity ratio | 2.8 | 2.8 | 2.4 | 2.3 |

As can be seen, the silane treatments effectively reduce the paint viscosity and/or thixotropy (viscosity ratio). This provides the advantage of being able to increase the sprayable solids as well as improve the gloss.

EXAMPLE 11

$CaCO_3$ (Camelwite$^{TM1}$: average particle size 99% finer than 10 microns, (wet ground), range 0.3 to 14 microns, wet ground) was treated with 1.0 weight percent Silane A using the method of Example 5. Viscosity of polyester resin containing untreated Camelwite and the above treated Camelwite was measured as in Example 3 except that the filler concentration was 225 parts per 100 parts (by weight) resin.
1. Sold by H. M. Royal Co., Trenton, N.J.

|  | Viscosity, 10 RPM $10^3$ cps |
| --- | --- |
| Camelwite - untreated | 44.5 |
| Camelwite treated with Silane A | 33.5 |

The Camelwite was then treated with 1% of the silane composition of Example 8, again using the treating method of Example 5. Bulk Molding Compounds (BMC) were prepared and evaluated as in Example 4 except that the filler concentration in the BMC was 350 parts per 100 parts of resin by weight. The results were:

|  | FIller Wet-Out Time seconds | Glass Dispersion Quality | Flexural Strength, psi |
| --- | --- | --- | --- |
| Camelwite, untreated | 150 | Fair | 12,500 |
| Camelwite, treated | 130 | Good | 14,800 |

EXAMPLE 12

Huber ®[1] 35 Clay (water fractionated Georgia Kaolin; 99.7% passes 325 mesh screen; 30–40% finer than 2 microns) was treated with 1% of the silane composition of Example 11 by the method of Example 5 except that 40 pounds of the filler were treated in a larger twin shell blender. Viscosity of polyester resin containing 100 parts by weight of Huber 35 Clay, untreated and treated was determined by the general method of Example 3.
1. Sold by J. M. Huber Corp., Clay Division, Huber, Ga. 31040

|  | Viscosity 90° F. Brookfield HBT, Spindle TA, 5 RPM $10^6$ cps |
| --- | --- |
| Huber 35 Clay, untreated | 9.9 |
| Huber 35 Clay, treated | 6.4 |

The same treated and untreated Huber 35 Clay was used to prepare the Bulk Molding Compound of Example 4 except that 175 parts (by weight) Clay per 100 parts resin were used.

|  | Glass Dispersion Quality | Flexural Strength psi | | Flexural Modulus $10^6$ psi | |
| --- | --- | --- | --- | --- | --- |
|  |  | Initial | After 8 hour boil | Initial | After 8 hour boil |
| Huber 35 Clay, Untreated | Poor | 13,880 | 9,700 | 1.8 | 1.0 |
| Huber 35 Clay, treated | Good | 16,290 | 12,930 | 2.0 | 1.4 |

EXAMPLE 13

Suzorite TM[1] Mica (Phlogopite ore, flake crystal, 1 micron to 0.75 inch 75/1 aspect ratio) was treated with 1.0% Silane A by the method of Example 5 except that 1.5 pounds of the mica were treated. Viscosity of polyester resin containing 100 parts by weight of treated and untreated mica was compared by the method of Example 3.
1. Sold by Marrietta Resources International Ltd., Rockville, Md.

|  | Viscosity, 90° F. Brookfield HBT, 10 RPM, Spindle No. 4 $10^3$ cps |
| --- | --- |
| Suzorite Mica, untreated | 40.0 |
| Suzorite Mica, treated | 26.0 |

More Suzorite Mica was then treated with 1.0 weight percent of the silane composition of Example 11 by the method of Example 5. Bulk Molding Compounds were prepared and evaluated as in Example 4 except that 69 parts by weight of treated and untreated Mica per 100 parts resin, and 100 parts of glass per 100 parts resin were used.

|  | Flexural Strength $10^3$ psi | Flexural Modulus $10^6$ psi |
| --- | --- | --- |
| Suzorite Mica, untreated | 4,920 | 1.47 |
| Suzorite Mica, treated | 6,690 | 2.22 |

EXAMPLE 14

Furnace Creek TM[1] Talc (8 micron median particle szze, plate structure, low iron) was treated with 1.0 and 0.5 weight percent Silane A by the method of Example 5. Viscosity effects were determined as in Example 3 except that 100 parts filler per 100 parts resin (by weight) were used.
1. Sold by Cyprus Industrial Minerals Co., Los Angeles, Calif.

|  | Viscosity 90° F. Brookfield HBT, 10 RPM, $10^3$ cps |
| --- | --- |
| Furnace Creek Talc, untreated | 58.0 |
| Furnace Creek Talc treated with 0.5% Silane A | 37.0 |
| Furnace Creek Talc treated with 1.0% Silane A | 32.0 |

EXAMPLE 15

Wollastonite[1] F-1 (CaSiO$_3$, 22 micron median particle size 15/1 aspect ratio) was treated with 0.5 weight percent Silane A as in Example 5 except that 2.0 pounds of filler were charged to the twin shell blender. Viscosity lowering effect in polyester resin was measured as in Example 3 except that 62.5 parts filler per 100 parts (by weight) resin were used.

1. Sold by Interpace Corp., Willsboro, N.Y.

|  | Viscosity, 90° F. 10$^3$ cps Brookfield Model HBT, No. 4 Spindle, 10 RPM |
|---|---|
| Wollastonite F-1 untreated | 42. |
| Wollastonite F-1 treated with 0.5% Silane A | 38. |

Wollastonite P-1 (9 micron, median particle size, 8/1 aspect ratio) was treated with 1.0 wt. % of the silane composition of Example 11 as in Example 5 and compared with untreated Wollastonite P-1 in the polyester Bulk Molding Compound of Example 4 except that 200 parts of the filler were used:

|  | Glass Dispersion Quality | Flexural Strength, psi | |
|---|---|---|---|
|  |  | Initial | After 8 hour boil |
| Wollastonite P-1, untreated | Poor | 10,500 | 8,000 |
| Wollastonite P-1, treated | Good | 12,600 | 14,900 |

EXAMPLE 16

This example shows processing and physical property benefits to treating alumina trihydrate for use in a rigid polyvinyl chloride resin containing formulation of the type used for pipe manufacture.

Separate samples of Alcoa TM[1] Hydral 710 (1.0 micron precipitated alumina trihydrate) was treated with Silane A and with the following silane blend, as in Example 3:

1. Aluminum Company of America, Pittsburgh, Pa.

| Silane A | 75 weight percent |
|---|---|
| O<br>‖<br>H$_2$NCNHC$_3$H$_6$Si(OC$_2$H$_5$)$_3$ (A-1160) | 25 weight percent |

Treated and untreated Hydral 710 premixed with the other ingredients shown below were compounded in a Braebender Plasticorder (C. W. Braebender Instruments, Inc., South Hackensack, New Jersey) equipped with a No. 5 mixing head. The cavity was maintained at 200° C. and the mixer operated at a constant 60 RPM. Torque was recorded on a scale of 0 to 6000 meter-grams/second. Fluxing time was 4 minutes from the time when torque began to increase. Maximum torque generated is an indication of processability. The lower the peak torque, the better the processing.

Test plaques were prepared by placing the compound in a 6 inch×6 inch×0.075 inch chrome plated mold preheated to 175° C. Contact pressure was applied for one minute to soften the compound. Force was then increased to 75 tons per 1 minute, maintaining 175° C. platten temperature. The press was then cooled 5 minutes by running cold water to the plattens, and the force increased to 125 tons. The composite was removed when the mold had cooled to room temperature.

The composites were tested for tensile stress at yield and failure, modulus, and ultimate elongation and modified Gardner Impact Strength by standard methods.

| Formulation | parts by weight |
|---|---|
| BAKELITE ® QSAN-7[2] (polyvinylchloride resin powder) | 100 |
| Hydral 710 (Alcoa$^{TM}$, 1 micron precipitated alumina trihydrate, treated and untreated | 70 |
| Thermolite 73 (M & T Chemicals - Proprietary Stabilizer) | 1.0 |
| Calcium Stearate | .85 |
| Acryloid K12OND[3] | 1.8 |
| Polyethylene AC629A[4] (Processing Aid) | 0.1 |

[2] Union Carbide Corp., New York, N.Y.
[3] Rohm & Haas Company, Philadelphia, Pa.
[4] Allied Chemical Corporation, Morristown, N.J.

Processing characteristics during compounding in the Braebender Plasticorder and physical properties of molded plaques containing the three fillers are shown below:

| Treatment on Filler | None | 1% Silane A | 1%(75% Silane A + 25% A-1160) |
|---|---|---|---|
| Maximum Compounding Torque: meter-grams | 5,640 | 4,200 | 4,380 |
| Reduction over no treatment, % | 0 (base) | 26 | 22 |
| Tensile Stress, at yield, psi | 6,739 | 5,188 | 6,393 |
| Tensile Stress, at break, psi | 6,739 | 5,188 | 6,344 |
| Ultimate Elongation, % | 3.4 | 8.8 | 4.0 |
| Modulus, 10$^3$ psi | 384 | 401 | 439 |
| Modified Gardner Impact, inch-pounds | 6.0 | >15 | >15 |

The data show that Silane A improves processing, has a plasticizing action, and significantly improves impact strength. The presence of the reactive silane, A-1160, overcomes the plasticizing effects of Silane A without sacrificing its processing or impact strength improvement contribution.

EXAMPLE 17

Two pounds of pelletized furnace black (Sterling ®[1] V-3853) were ground to a powder by mortar and pestle and charged to a 1 gallon jar, which was then rotated on a jar mill for 5 minutes to assure a free flowing powder mass. To achieve a 1.0 weight percent silane concentration based on carbon black weight, 9.08 grams of Silane A were diluted with 10 grams of methanol. About one quarter of this solution was added to the jar which was allowed to rotate five minutes and the remainder of the solution added in quarters with five minute mixing between each increment. When all the solution had been added, the jar was rotated for an additional 20 to 30 minutes. The treated carbon black was then over dried 2 hours at 100° C.

1. Sold by Cabot Corp., Boston, Mass.

The effect of the Silane A treatment is shown in the viscosity of polyester resin containing treated and untreated carbon black. The viscosity test of Example 3 (2 Jun 76 letter) was run except that 30 parts of carbon black per 100 of resin was the maximum achievable loading.

| Furnace Black | Viscosity: Brookfield HBT, 90° F. Spindle No. 4, 10 RPM $10^3$ cps |
|---|---|
| Untreated | 48.8 |
| Treated with 1% Silane A | 16.0 |

What is claimed is:

1. A composition comprising inorganic oxide particles containing on their surfaces a silane, its hydrolyzates or resulting condensate, which silane possesses at least two to about three hydrolyzable groups bonded to the silicon thereof and an organic group which contains a polyalkylene oxide group.

2. The composition of claim 1 wherein the amount of silane is from about 0.25 to about 90 weight percent of the composition.

3. The composition of claim 2 wherein the amount of the silane is from about 0.5 to about 5 weight percent of the composition.

4. The composition of claim 1 wherein the silane has the following general formula:

$$R^{II}(OR^I)_a ORSiX_3$$

wherein R can be any divalent organic group which is either oxygen or carbon bonded to the silicon atom, $R^I$ is one or more 1,2-alkylene groups each containing at least 2 carbon atoms and typically not more than about 4 carbon atoms; $R^{II}$ is hydrogen, alkyl, acyloxy or an organofunctional group; a is a number having a value of from 4 to about 150; and X is a hydrolyzable group.

5. A composition as claimed in claim 4 wherein a has a value of from 4 to about 120.

6. The composition of claim 4 wherein the silane is coreacted or comixed with a different silane, as encompassed by the following formula:

$$R^3{}_n(SiX_{4-n})_b$$

or the cohydrolyzate or the cocondensate of such different silane with the silane, wherein $R^3$ is an organic radical whose free valence is equal to the value of b, X is as defined above, n is equal to 0 or 1 and b is a positive number.

7. A resin or plastic composition containing the treated inorganic oxide particles of claim 1.